(12) United States Patent
Guan et al.

(10) Patent No.: US 10,277,124 B2
(45) Date of Patent: Apr. 30, 2019

(54) DC-DC CONVERTER, BOOSTING UNIT, ELECTRIC VEHICLE AND BATTERY BACKUP SYSTEM

(71) Applicant: BOE TECHNOLOGY GROUP CO., LTD., Beijing (CN)

(72) Inventors: Enhui Guan, Beijing (CN); Masakazu Okamura, Beijing (CN); Shuo Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/565,827

(22) PCT Filed: Jun. 28, 2017

(86) PCT No.: PCT/CN2017/090619
§ 371 (c)(1),
(2) Date: Oct. 11, 2017

(87) PCT Pub. No.: WO2018/024052
PCT Pub. Date: Aug. 2, 2018

(65) Prior Publication Data
US 2018/0316263 A1    Nov. 1, 2018

(30) Foreign Application Priority Data
Aug. 4, 2016  (CN) .......................... 2016 1 0634582

(51) Int. Cl.
*H02M 3/156*    (2006.01)
*H02M 3/07*    (2006.01)

(52) U.S. Cl.
CPC ............. *H02M 3/156* (2013.01); *H02M 3/07* (2013.01)

(58) Field of Classification Search
CPC ........ H02M 3/07; H02M 3/156–3/158; H02M 3/33592; H02M 1/4208; H02M 1/4225;
(Continued)

(56) References Cited

U.S. PATENT DOCUMENTS 5,726,872 A * 3/1998 Vinciarelli ............ H02M 3/158
323/222
5,737,204 A * 4/1998 Brown ..................... H02J 9/062
323/285
(Continued)

FOREIGN PATENT DOCUMENTS

CN      103683920 A    3/2014
CN      203590024 U    5/2014
(Continued)

OTHER PUBLICATIONS

International Search Report and Written Opinion from PCT/CN2017/090619 dated Aug. 16, 2017.
(Continued)

*Primary Examiner* — Yemane Mehari
(74) *Attorney, Agent, or Firm* — Dilworth & Barrese, LLP; Michael J. Musella, Esq.

(57) ABSTRACT

Provided are a boosting unit, a DC-DC converter including the boosting unit, and an electric vehicle. The DC-DC converter includes: a switch connected to an input voltage; a main diode connected to the switch; a regulating capacitor, a first terminal of the regulating capacitor being connected in series with the main diode, a second terminal of the regulating capacitor being connected to the input voltage, and the first terminal and the second terminal of the regulating capacitor serving as output terminals of the DC-DC converter; and a boosting unit, the boosting unit comprising a first inductor, a second inductor, a boosting capacitor, a first unidirectional conducting device, a second unidirectional conducting device, a third unidirectional conducting
(Continued)

device and a fourth unidirectional conducting device. According to the embodiments of the present disclosure, voltage gain can be increased by replacing inductors in the ordinary DC-DC converter with the boosting unit.

20 Claims, 12 Drawing Sheets

(58) Field of Classification Search
CPC ..... G05F 1/33; G05F 1/38; G05F 1/56; Y02B 70/126; Y02B 70/1475
USPC .......... 363/73–82, 89, 90, 125–127
See application file for complete search history.

(56) References Cited

U.S. PATENT DOCUMENTS

| | | | | |
|---|---|---|---|---|
| 7,508,185 B2* | 3/2009 | Lin | ............ | H02M 1/34 |
| | | | | 323/282 |
| 9,047,076 B1* | 6/2015 | Lee | ............ | G06F 1/263 |
| 2009/0145674 A1* | 6/2009 | Lee | ............ | B60K 6/405 |
| | | | | 180/65.1 |

FOREIGN PATENT DOCUMENTS

| | | |
|---|---|---|
| CN | 105490523 A | 4/2016 |
| CN | 206237306 U | 6/2017 |
| JP | 2003348834 A | 12/2003 |

OTHER PUBLICATIONS

Jiao et al., "Voltage-lift-type switched-inductor cells for enhancing DC-DC boost ability, principles and integrations in Luo converter"; IET Power Electronics, 2011, 4(1): 131-142.

* cited by examiner

S is turned on

S is turned off

Waveform of the output voltage $S_1$ is turned on $S_1$ is turned off

DC-DC CONVERTER, BOOSTING UNIT, ELECTRIC VEHICLE AND BATTERY BACKUP SYSTEM

TECHNICAL FIELD

Embodiments of the present disclosure relate to a boosting unit, a DC-DC converter comprising the boosting unit, an electric vehicle and a battery backup system.

BACKGROUND

In order to improve voltage conversion ratio of a circuit, usually a DC-DC converter selects a duty cycle with an extreme value or introduces a transformer structure. In addition, changing circuit topology structure has also been tried in order to improve the voltage conversion ratio of the circuit. However, voltage gain achieved by the foresaid methods is still limited strictly by the circuit topology structure and the duty cycle value.

Therefore, there is a need for a new circuit structure capable of increasing the voltage gain.

SUMMARY

According to an embodiment of the present disclosure, there is provided a boosting unit, comprising: a first inductor, a first terminal of the first inductor serving as an input terminal of the boosting unit; a boosting capacitor, a first terminal of the boosting capacitor being connected to a second terminal of the first inductor; a first unidirectional conducting device, a first terminal of the first unidirectional conducting device being connected to the second terminal of the first inductor, and a second terminal of the first unidirectional conducting device being connected to an output terminal of the boosting unit; a second unidirectional conducting device, a first terminal of the second unidirectional conducting device being connected to the first terminal of the first inductor, and a second terminal of the second unidirectional conducting device being connected to a second terminal of the boosting capacitor; a third unidirectional conducting device, a first terminal of the third unidirectional conducting device being connected to the second terminal of the boosting capacitor, and a second terminal of the third unidirectional conducting device being connected to a first terminal of a second inductor; a fourth unidirectional conducting device, a first terminal of the fourth unidirectional conducting device being connected to the first terminal of the first inductor, and a second terminal of the fourth unidirectional conducting device being connected to the first terminal of the second inductor; and the second inductor, a second terminal of the second inductor serving as the output terminal of the boosting unit.

In an example, during a charging period, the first unidirectional conducting device, the second unidirectional conducting device and the fourth unidirectional conducting device are turned on, and the third unidirectional conducting device is turned off; and during a discharging period, the first unidirectional conducting device, the second unidirectional conducting device and the fourth unidirectional conducting device are turned off, and the third unidirectional conducting device is turned on.

In an example, each of the first unidirectional conducting device, the second unidirectional conducting device, the third unidirectional conducting device and the fourth unidirectional conducting device is a diode, and a first terminal of each of the unidirectional conducting devices is an anode of the corresponding diode and a second terminal of each of the unidirectional conducting devices is a cathode of the corresponding diode.

According to another embodiment of the present disclosure, there is provided a DC-DC converter, comprising: a switch connected to an input voltage; a main diode connected to the switch; a regulating capacitor, a first terminal of the regulating capacitor being connected in series with the main diode, a second terminal of the regulating capacitor being connected to the input voltage, and the first terminal and the second terminal of the regulating capacitor serving as output terminals of the DC-DC converter; and any of the boosting units as described above.

In an example, the number of the boosting unit comprised by the DC-DC converter is two or more, the two or more boosting units are cascaded in stages, and the DC-DC converter further comprises: a connection control unit connected between every two stages of boosting units and configured to connect the boosting unit in a present stage in parallel with the boosting unit in a previous stage during a charging period and to connect the boosting unit in a present stage in series with the boosting unit in a previous stage during a discharging period.

In an example, the connection control unit comprises: a first connection control device, a first terminal of the first connection control device being connected to an input terminal of the boosting unit in a previous stage, and a second terminal of the first connection control device being connected to an input terminal of the boosting unit in a next stage; a second connection control device, a first terminal of the second connection control device being connected to an output terminal of the boosting unit in the previous stage, and a second terminal of the second connection control device being connected to the second terminal of the first connection control device; and a third connection control device, a first terminal of the third connection control device being connected to an output terminal of the boosting unit in the previous stage, and a second terminal of the third connection control device being connected to an output terminal of the boosting unit in the next stage.

In an example, during a charging period, the first connection control device and the third connection control device are turned on, and the second connection control device is turned off; and during a discharging period, the first connection control device and the third connection control device are turned off, and the second connection control device is turned on.

In an example, each of the first connection control device, the second connection control device and the third connection control device is a diode, and a first terminal of each of the connection control devices is an anode of the corresponding diode and a second terminal of each of the connection control devices is a cathode of the corresponding diode.

According to another embodiment of the present disclosure, there is provided a battery backup system comprising any of the DC-DC converters described above.

According to another embodiment of the present disclosure, there is provided an electric vehicle comprising any of the DC-DC converters as described above.

According to the embodiments of the present disclosure, voltage gain can be increased by replacing inductors in the ordinary DC-DC converter with the boosting unit.

BRIEF DESCRIPTION OF THE DRAWINGS

The present disclosure will be more readily understood from the following detailed description provided in conjunction with the accompanying drawings in which like reference numerals indicate like elements, and in which.

DETAILED DESCRIPTION OF THE EMBODIMENTS

Hereinafter, the technical solutions in the embodiments of the present disclosure will be described clearly and comprehensively in combination with the drawings thereof, obviously, these described embodiments are parts of the embodiments of the present disclosure, rather than all of the embodiments thereof. All other embodiments obtained by those of ordinary skill in the art based on the embodiments of the present disclosure without making creative work are within the scope of the present disclosure.

Figure 1:
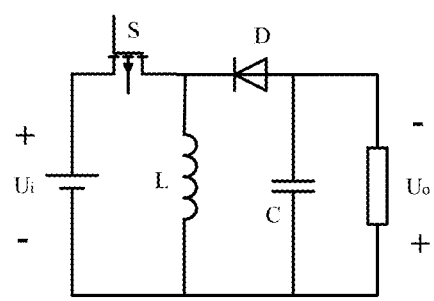
FIG. 1 is an exemplary circuit diagram showing structure of a DC-DC converter.
Figure 2A:
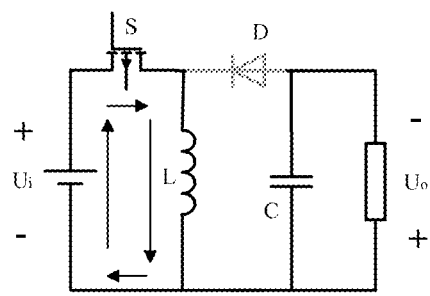
FIGS. 2a and 2b are schematic diagrams illustrating operating modes of the DC-DC converter shown in FIG. 1.
Figure 2B:
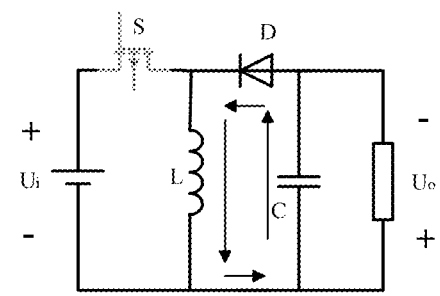

FIG. 1 is an exemplary circuit diagram showing structure of a DC-DC converter, and FIGS. 2a and 2b are schematic diagrams illustrating operating modes of the DC-DC converter shown in FIG. 1, wherein the DC-DC converter is a buck-boost DC-DC converter.

As shown in FIG. 2a, when a switch S of the DC-DC converter is turned on, a power supply charges an inductor L, and the voltage across two terminals of the inductor L is a power supply voltage Ui. In this case, the current direction in the circuit is indicated by the arrow.

As shown in FIG. 2b, when the switch S is turned off, the current across two terminals of the inductor L cannot jump, the diode D is turned on and forms a discharging loop together with the inductor L. In this case, the current direction in the circuit is indicated by the arrow. According to the volt-second balance principle of the inductor, it can be derived that, voltage gain of the DC-DC converter is Uo/Ui=D/(1−D), where D is a duty cycle of the signal that controls the switch S.

Figure 3:
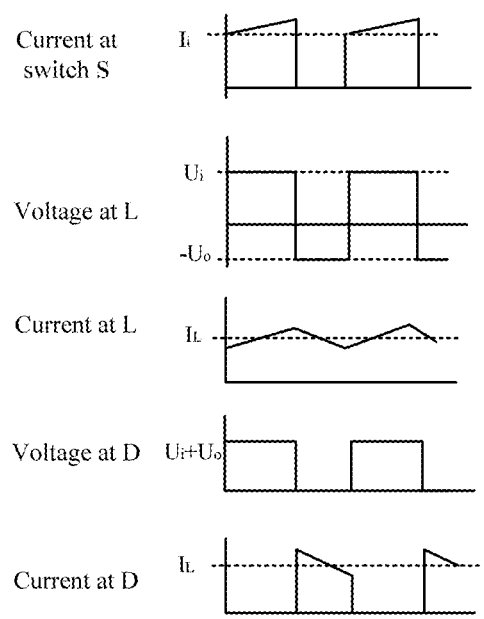
FIG. 3 is a schematic diagram showing waveforms of the input current, the voltage and the current at the diode D, and the voltage and the current across two terminals of the inductor L in the DC-DC converter as shown in FIG. 1.
Figure 4A:
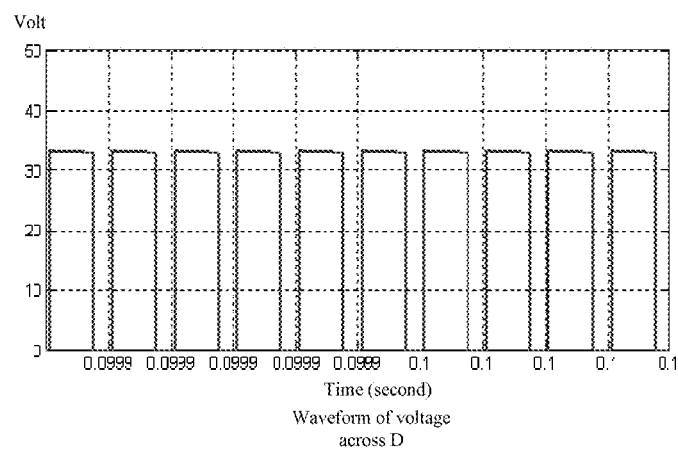
FIGS. 4a to 4c are simulation schematic diagrams showing the waveform of the voltage across two terminals of the diode, the waveform of the current across two terminals of the inductor, and the waveform of the output voltage in the DC-DC converter as shown in FIG. 1.
Figure 4B:
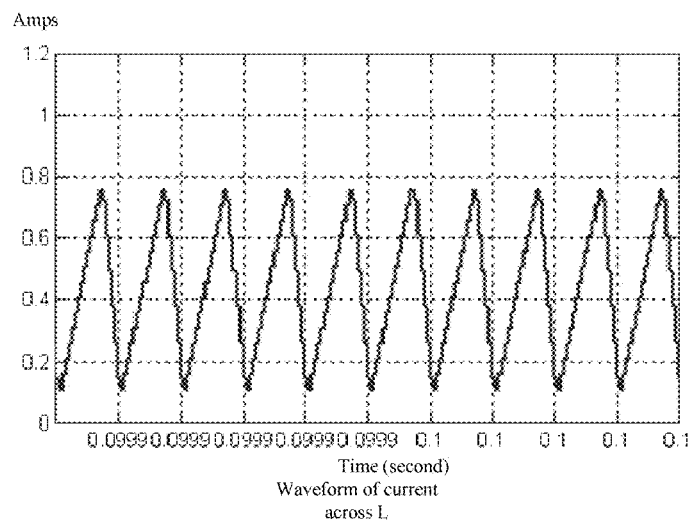
Figure 4C:
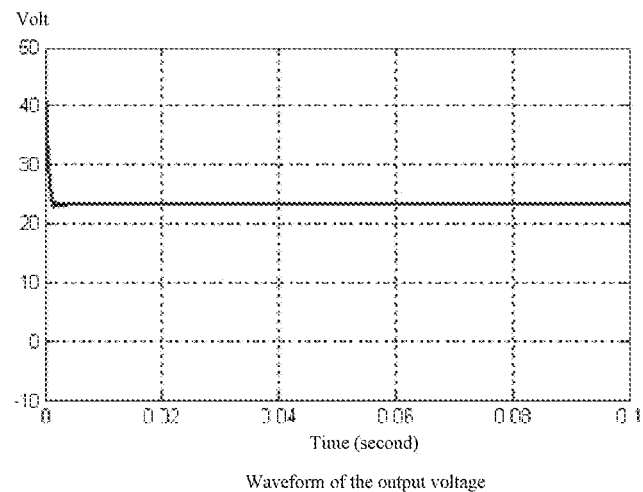

FIG. 3 is a schematic diagram showing waveforms of the input current, the voltage and the current at the diode D, and the voltage and the current across two terminals of the inductor L in the DC-DC converter as shown in FIG. 1, and FIG. 4 are simulation schematic diagrams showing the waveform of the voltage across two terminals of the diode, the waveform of the current across two terminals of the inductor, and the waveform of the output voltage in the DC-DC converter as shown in FIG. 1.

Figure 5:
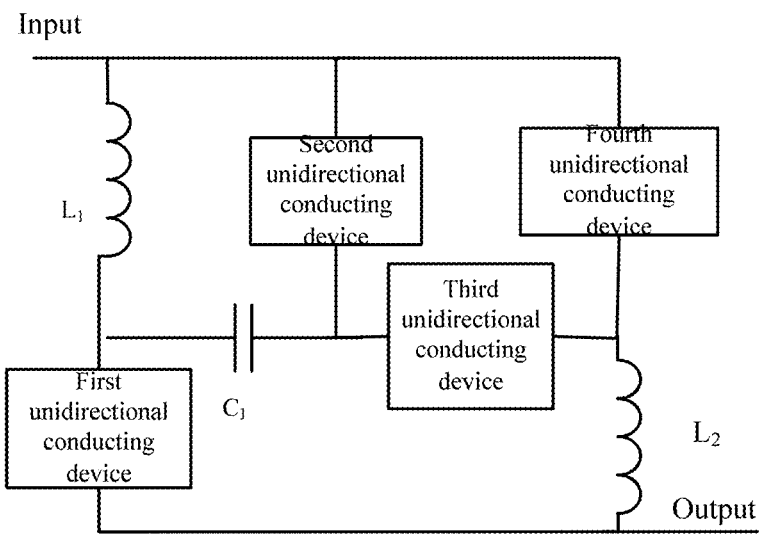
FIG. 5 shows a schematic diagram of structure of the boosting unit according to an embodiment of the present disclosure.

FIG. 5 shows a schematic diagram of structure of the boosting unit according to an embodiment of the present disclosure.

As shown in FIG. 5, the boosting unit comprises a first inductor $L_1$, a boosting capacitor $C_1$, a first unidirectional conducting device, a second unidirectional conducting device, a third unidirectional conducting device, a fourth unidirectional conducting device and a second inductor $L_2$.

A first terminal of the first inductor $L_1$ serves as an input terminal Input of the boosting unit. A first terminal of the boosting capacitor $C_1$ is connected to a second terminal of the first inductor $L_1$. A first terminal of the first unidirectional conducting device is connected to the second terminal of the first inductor $L_1$, and a second terminal of the first unidirectional conducting device is connected to an output terminal Output of the boosting unit. A first terminal of the second unidirectional conducting device is connected to the first terminal of the first inductor $L_1$, and a second terminal of the second unidirectional conducting device is connected to a second terminal of the boosting capacitor $C_1$. A first terminal of the third unidirectional conducting device is connected to the second terminal of the boosting capacitor $C_1$, and a second terminal of the third unidirectional conducting device is connected to a first terminal of the second inductor $L_2$. A first terminal of the fourth unidirectional conducting device is connected to the first terminal of the first inductor $L_1$, and a second terminal of the fourth unidirectional conducting device is connected to the first terminal of the second inductor $L_2$. A second terminal of the second inductor $L_2$ serves as the output terminal of the boosting unit.

The boosting unit can be applied to a DC-DC converter. In particular, during a charging period, the first unidirectional conducting device, the second unidirectional conducting device and the fourth unidirectional conducting device are turned on, and the third unidirectional conducting device is turned off; and during a discharging period, the first unidirectional conducting device, the second unidirectional conducting device and the fourth unidirectional conducting device are turned off, and the third unidirectional conducting device is turned on.

In an example, each of the first unidirectional conducting device, the second unidirectional conducting device, the third unidirectional conducting device and the fourth unidirectional conducting device is a diode, and a first terminal of each of the unidirectional conducting devices is an anode of the corresponding diode and a second terminal of each of the unidirectional conducting devices is a cathode of the corresponding diode. However, the embodiments of the present disclosure are not limited thereto.

Figure 6:
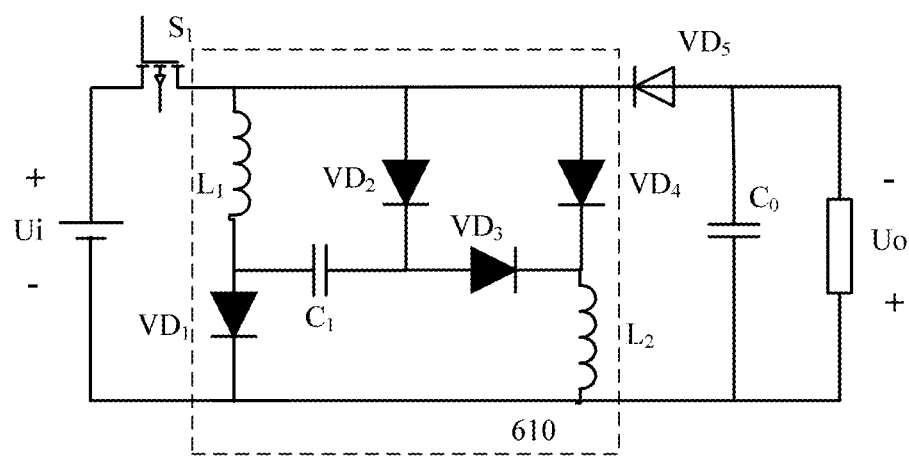
FIG. 6 shows a schematic circuit diagram of structure of a DC-DC converter comprising the boosting unit as shown in FIG. 5 according to an embodiment of the present disclosure.

FIG. 6 shows a schematic circuit diagram of structure of a DC-DC converter 600 comprising the boosting unit as shown in FIG. 5 according to an embodiment of the present disclosure;

As shown in FIG. 6, the DC-DC converter 600 comprises a switch $S_1$, a main diode $VD_5$, a regulating capacitor $C_0$ and a boosting unit 610.

The switch $S_1$ is connected to an input voltage Ui. The main diode $VD_5$ is connected to the switch $S_1$. A first terminal of the regulating capacitor $C_0$ is connected in series with the main diode $VD_5$, a second terminal of the regulating capacitor $C_0$ is connected to the input voltage Ui, and the first terminal and the second terminal of the regulating capacitor $C_0$ serve as output terminals of the DC-DC converter 500, i.e., outputting the voltage Uo. An input terminal of the boosting unit 610 is connected to the switch $S_1$ to receive the input voltage Ui, and an output terminal of the boosting unit 610 is connected to the second terminal of the regulating capacitor $C_0$, the boosting unit 610 comprises a first inductor $L_1$, a second inductor $L_2$, a boosting capacitor $C_1$, a first unidirectional conducting device $VD_1$, a second unidirectional conducting device $VD_2$, a third unidirectional conducting device $VD_3$ and a fourth unidirectional conducting device $VD_4$.

According to an embodiment of the present disclosure, voltage gain can be increased by replacing inductors in the ordinary DC-DC converter with the boosting unit.

In an example, as shown in FIG. 6, a first terminal of the first inductor $L_1$ is the input terminal of the boosting unit 610; a first terminal of the boosting capacitor $C_1$ is connected to a second terminal of the first inductor $L_1$; an anode of the first unidirectional conducting device $VD_1$ is connected to the second terminal of the first inductor $L_1$, a cathode of the first unidirectional conducting device $VD_1$ is connected to an output terminal of the boosting unit 610; an anode of the second unidirectional conducting device $VD_2$ is connected to the first terminal of the first inductor $L_1$, a cathode of the second unidirectional conducting device $VD_2$ is connected to a second terminal of the boosting capacitor $C_1$; an anode of the third unidirectional conducting device $VD_3$ is connected to the second terminal of the boosting capacitor $C_1$, a cathode of the third unidirectional conducting device $VD_3$ is connected to a first terminal of the second inductor $L_2$; an anode of the fourth unidirectional conducting device $VD_4$ is connected to the first terminal of the first inductor $L_1$, a cathode of the fourth unidirectional conducting device $VD_4$ is connected to the first terminal of the second inductor $L_2$; and the second terminal of the second inductor $L_2$ is the output terminal of the boosting unit 610.

Figure 7A:
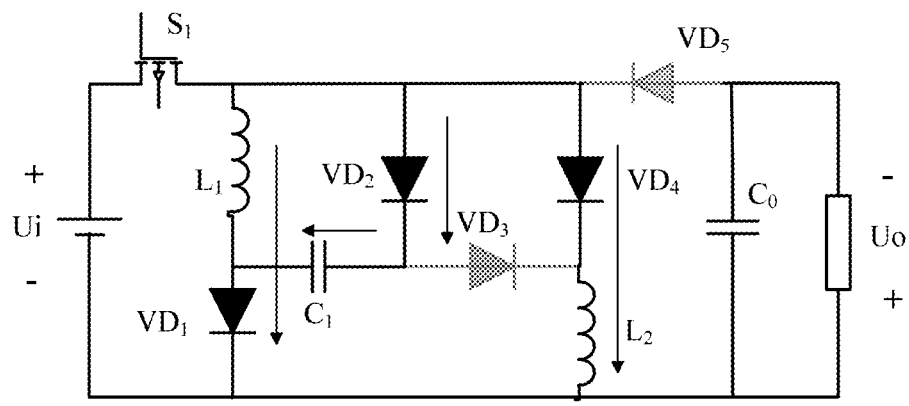
FIGS. 7a and 7b are schematic diagrams illustrating operating modes of the DC-DC converter shown in FIG. 6.
Figure 7B:
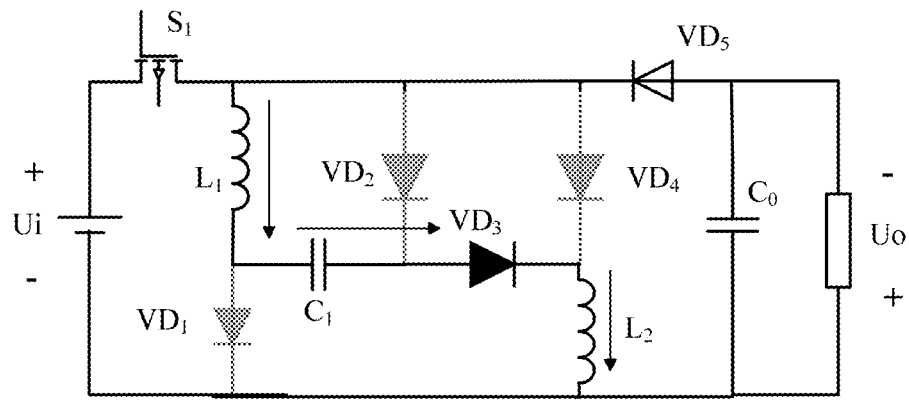

FIGS. 7a and 7b are schematic diagrams illustrating operating modes of the DC-DC converter 600 shown in FIG. 6.

As shown in FIG. 7a, when the switch $S_1$ is turned on, the first unidirectional conducting device $VD_1$, the second unidirectional conducting device $VD_2$ and the fourth unidirectional conducting device $VD_4$ are turned on, the third unidirectional conducting device $VD_3$ and the main diode $VD_5$ are turned off, and the DC input power supply Ui charges the inductors $L_1$, $L_2$ and the boosting capacitor $C_1$. In this case, the first inductor $L_1$, the second inductor $L_2$ and the boosting capacitor $C_1$ are connected in parallel in the circuit, and the voltage across two terminals of the inductor $L_1$ and the voltage across two terminals of the inductor $L_2$ are both Ui.

As shown in FIG. 7b, when the switch $S_1$ is turned off, the first unidirectional conducting device $VD_1$, the second unidirectional conducting device $VD_2$ and the fourth unidirectional conducting device $VD_4$ are turned off, the third unidirectional conducting device $VD_3$ and the main diode $VD_5$ are turned on and form a freewheeling circuit loop together with the first inductor $L_1$ and the second inductor $L_2$. In this case, the first inductor $L_1$, the second inductor $L_2$ and the boosting capacitor $C_1$ are connected in series in the circuit and operate collectively, and the voltage across two terminals of the first inductor $L_1$ and the voltage across two terminals of the second inductor $L_2$ are both $(Ui-Uo)/2$.

In the DC-DC converter 600, according to the volt-second balance principle of the inductor, it can be derived that, $UiD+(Ui-Uo)(1-D)/2=0$, thus voltage gain of the circuit is $Uo/Ui=(1+D)/(1-D)$, where D is a duty cycle of a control signal for controlling the switch $S_1$. In comparison to the voltage gain $D/(1-D)$ of the ordinary DC-DC converter shown in FIG. 1, the DC-DC converter 600 according to an embodiment of the present disclosure increases the voltage gain.

In addition, in comparison to the method of selecting the duty cycle with the extreme value to increase the circuit voltage gain, the DC-DC converter according to an embodiment of the present disclosure has less power loss. Also, in comparison to the method of realizing high voltage gain by using a transformer, the DC-DC converter according to an embodiment of the present disclosure has a smaller circuit size and a lower cost.

Figure 8:
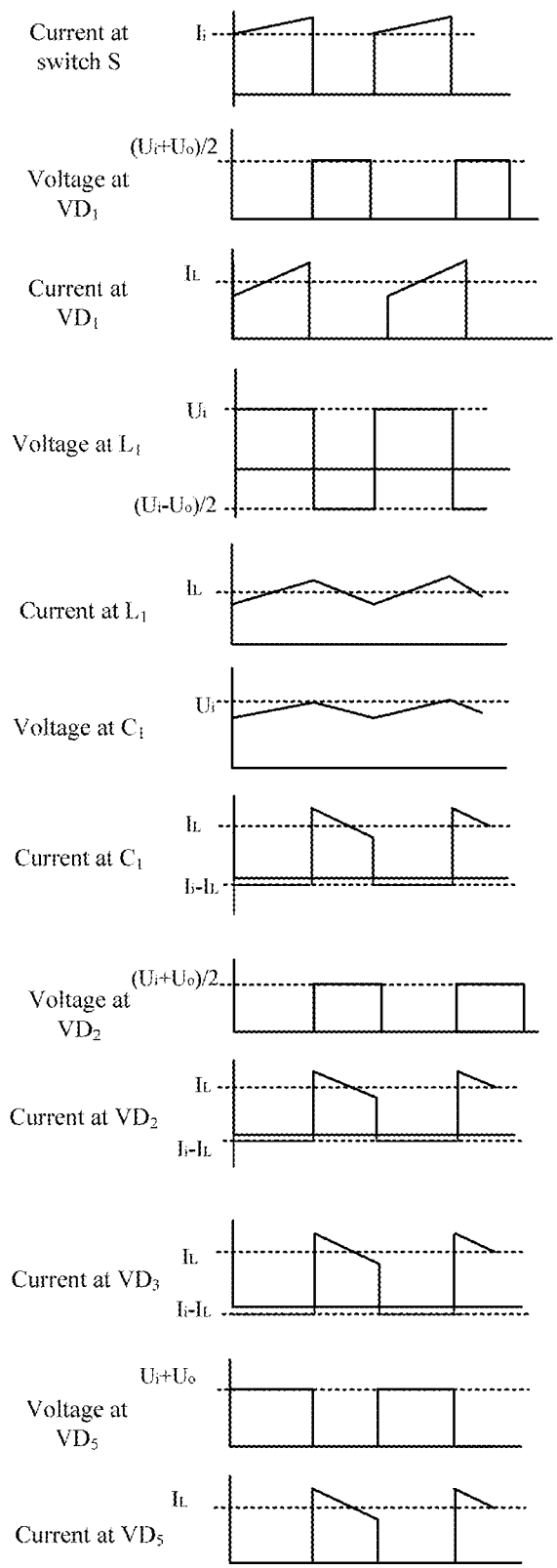
FIG. 8 is a schematic diagram showing waveforms of the voltage and/or current of elements in the DC-DC converter shown in FIG. 6.
Figure 9A:
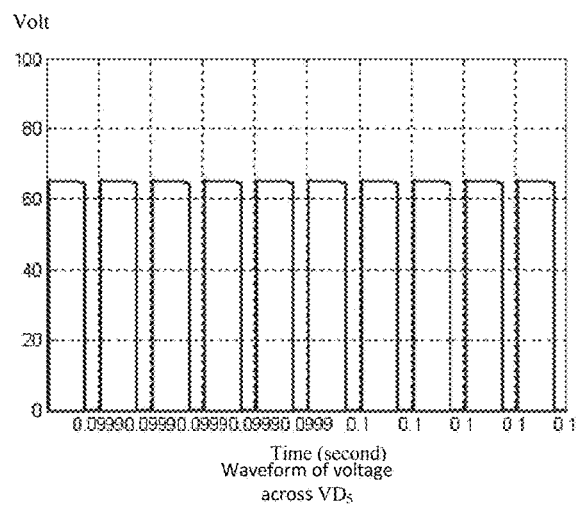
FIGS. 9a to 9d are simulation schematic diagrams showing waveforms of the voltage across two terminals of the main diode $VD_5$, the current across two terminals of the first inductor $L_1$, the voltage across two terminals of the boosting capacitor $C_1$, and the output voltage Uo of the DC-DC converter as shown in FIG. 6.
Figure 9B:
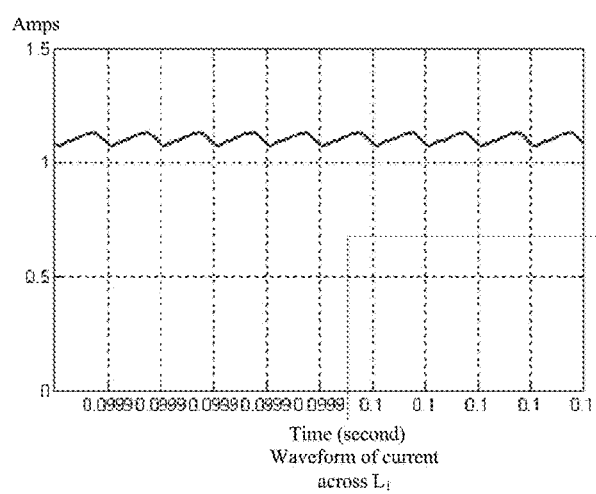
Figure 9C:
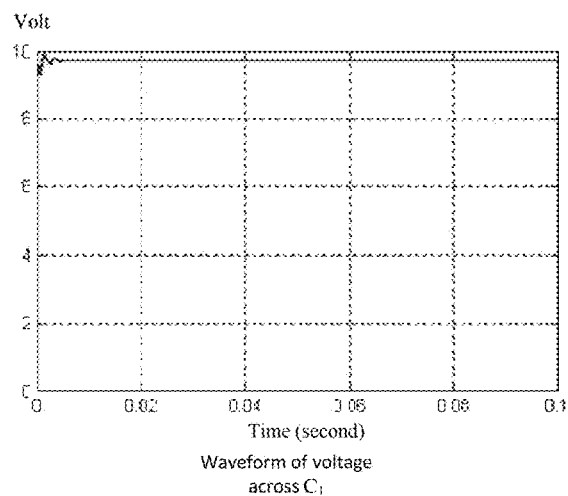
Figure 9D:
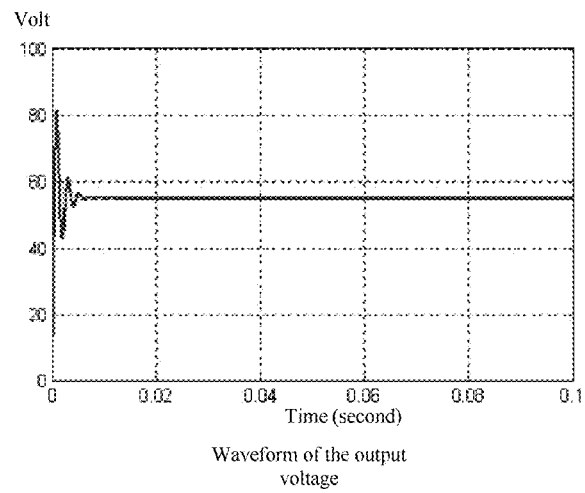

FIG. 8 is a schematic diagram showing waveforms of the voltage and/or current of elements in the DC-DC converter shown in FIG. 6. It should be understood that the waveform shown in FIG. 8 are merely illustrative and scale of some waveforms can be enlarged or reduced for illustrative purposes, so that the ratio between the respective waveforms may not be exactly the same as the actual values.

FIGS. 9a to 9d are simulation schematic diagrams showing waveforms of the voltage across two terminals of the main diode $VD_5$, the current across two terminals of the first inductor $L_1$, the voltage across two terminals of the capacitor $C_1$, and the output voltage Uo of the DC-DC converter as shown in FIG. 6.

Figure 10:
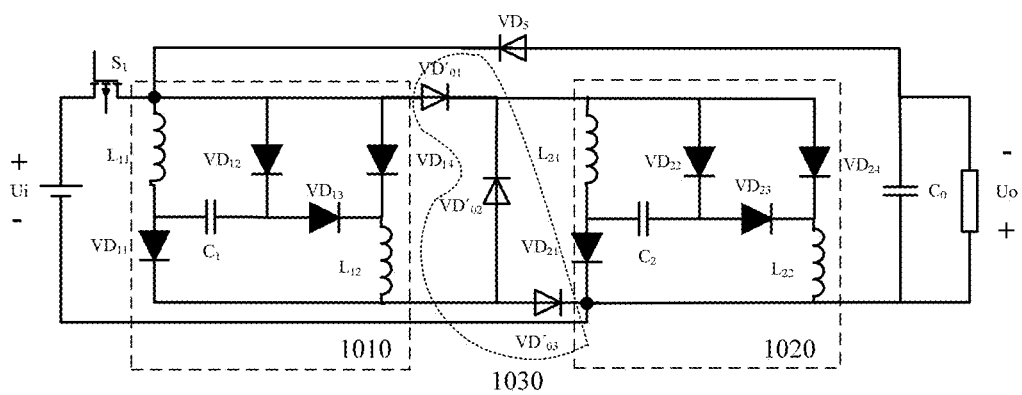
FIG. 10 is a schematic circuit diagram showing structure of a DC-DC converter according to another embodiment of the present disclosure.

FIG. 10 is a schematic circuit diagram showing structure of a DC-DC converter 1000 according to another embodiment of the present disclosure.

As shown in FIG. 10, the DC-DC converter 1000 comprises two boosting units 1010 and 1020 in addition to the switch $S_1$, the main diode $VD_5$ and the regulating capacitor $C_0$, and specific structure of the boosting units 1010 and 1020 is the same as that of the boosting unit 610 shown in FIG. 6, and details will not be described again.

In addition, the DC-DC converter 1000 shown in FIG. 10 further comprises a connection control unit 1030 connected between the two boosting units 1010 and 1020 and configured to connect the boosting unit 1020 and the boosting unit 1010 in parallel during a charging period, and to connect the boosting unit 1020 and the boosting unit 1010 in series during a discharging period.

In the example shown in FIG. 10, the connection control unit 1030 may comprise a first connection control device $VD'_{01}$, a second connection control device $VD'_{02}$ and a connection control device $VD'_{03}$.

A first terminal of the first connection control device $VD'_{01}$ is connected to the input terminal of the boosting unit 1010, and a second terminal of the first connection control device $VD'_{01}$ is connected to the input terminal of the boosting unit 1020. A first terminal of the second connection control device $VD'_{02}$ is connected to the output terminal of the boosting unit 1010, and a second terminal of the second connection control device VD'02 is connected to the second terminal of the first connection control device $VD'_{01}$. A first terminal of the third connection control device $VD'_{03}$ is connected to the output terminal of the boosting unit 1010, and a second terminal of the third connection control device $VD'_{03}$ is connected to the output terminal of the boosting unit 1020.

During a charging period, the first connection control device $VD'_{01}$ and the third connection control device $VD'_{03}$ are turned on, and the second connection control device $VD'_{02}$ is turned off; and during a discharging period, the first connection control device $VD'_{01}$ and the third connection control device $VD'_{03}$ are turned off, and the second connection control device $VD'_{02}$ is turned on.

In the example of FIG. 10, the first connection control device $VD'_{01}$, the second connection control device $VD'_{02}$ and the third connection control device $VD'_{03}$ are shown as diodes, and a first terminal of each of the connection control devices is an anode of the corresponding diode, and a second terminal of each of the connection control devices is a cathode of the diode.

Specifically, the anode of the first connection control device $VD'_{01}$ is connected to the input terminal of the boosting unit 1010, i.e., the first terminal of the first inductor $L_{11}$, the cathode of the first connection control device $VD'_{01}$ is connected to the input terminal of the boosting unit 1020, i.e., the first terminal of the first inductor $L_{21}$. The anode of the second connection control device $VD'_{02}$ is connected to the output terminal of the boosting unit 1010, i.e., the second terminal of the second inductor $L_{12}$, the cathode of the second connection control device $VD'_{02}$ is connected to the cathode of the first connection control device $VD'_{01}$. The anode of the third connection control device $VD'_{03}$ is connected to the output terminal of the boosting unit 1010, i.e., the second terminal of the second inductor $L_{12}$, the cathode of the third connection control device $VD'_{03}$ is connected to the output terminal of the boosting unit 1020, i.e., the second terminal of the second inductor $L_{22}$.

Figure 11A:
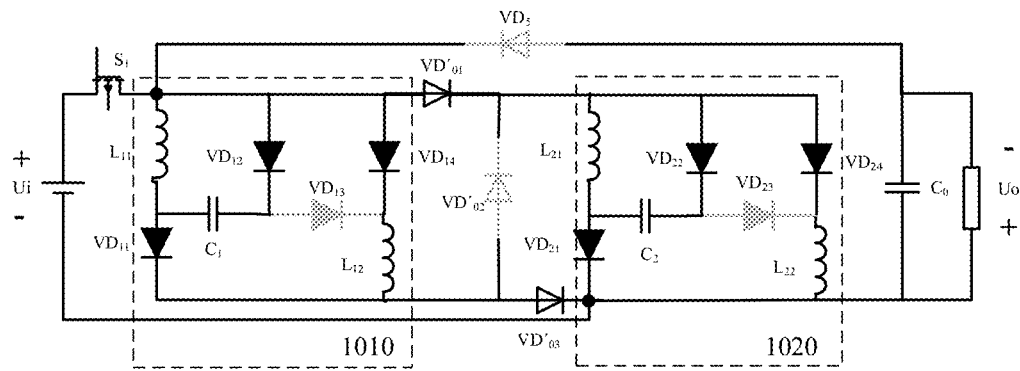
FIGS. 11a and 11b are schematic diagrams illustrating operating modes of the DC-DC converter shown in FIG. 10.
Figure 11B:
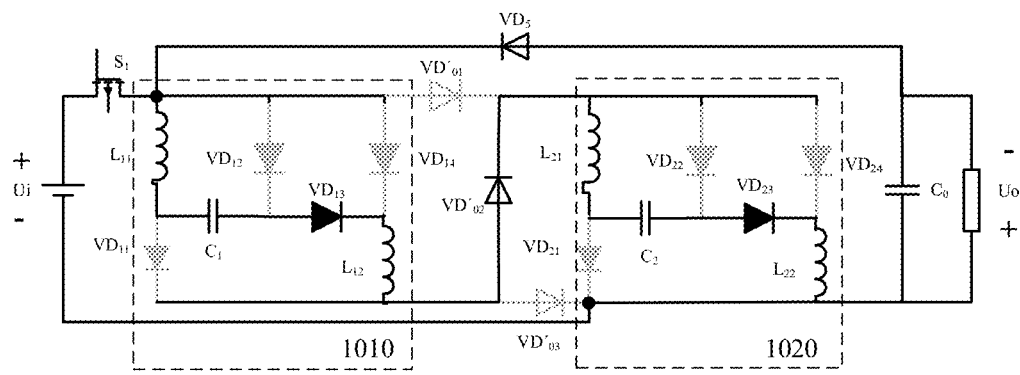
Figure 12A:
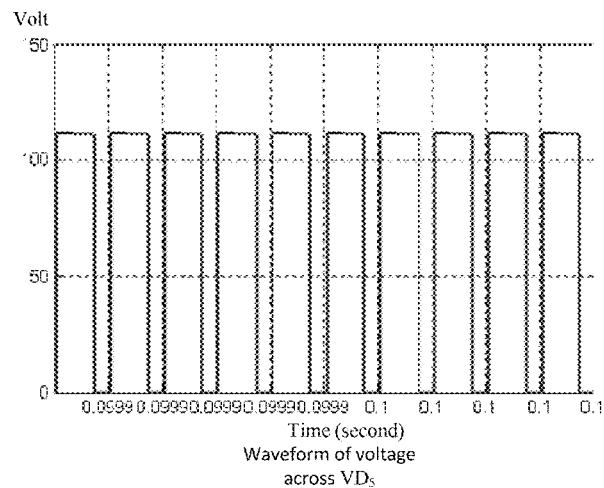
FIGS. 12a to 12d are simulation schematic diagrams showing waveforms of the voltage across two terminals of the main diode $VD_5$, the current across two terminals of the first inductor $L_{11}$ or $L_{21}$, the voltage across two terminals of the boosting capacitor $C_1$ or $C_2$, and the output voltage Uo of the DC-DC converter shown in FIG. 10.
Figure 12B:
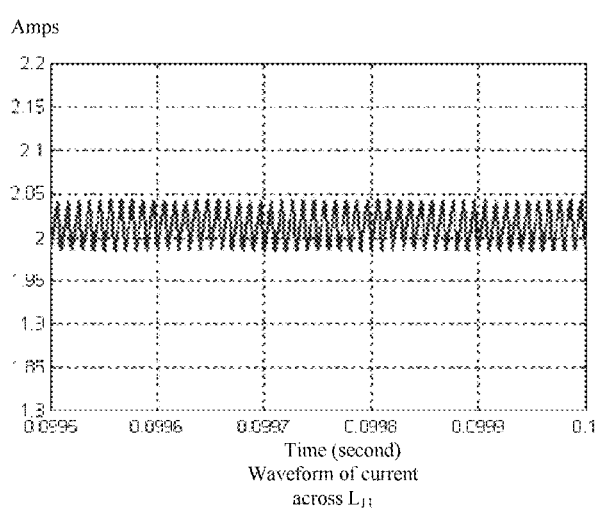
Figure 12C:
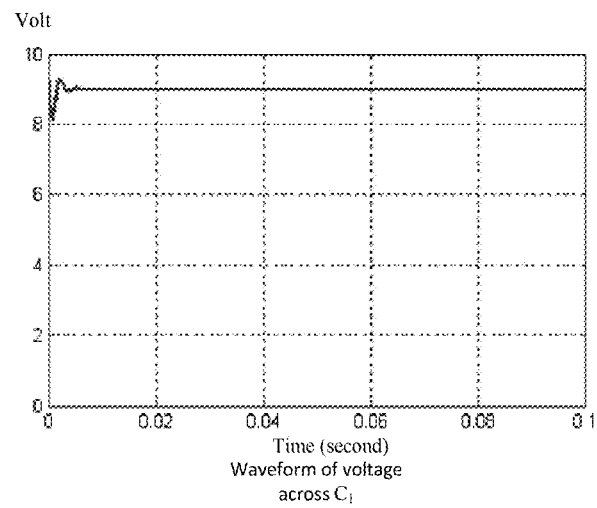
Figure 12D:
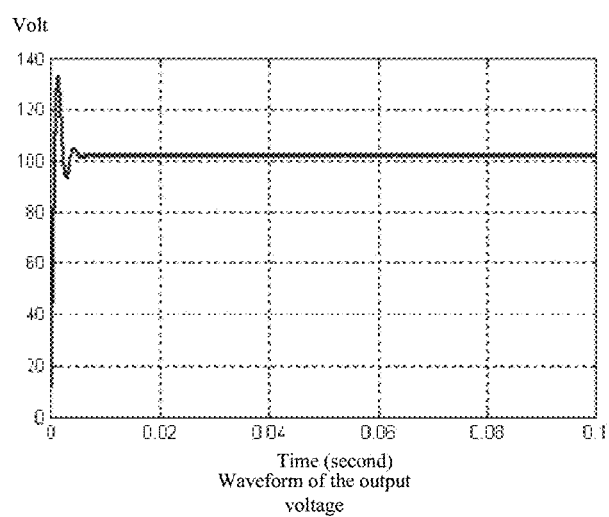

FIGS. 11a and 11b are schematic diagrams illustrating operating modes of the DC-DC converter 1000 shown in FIG. 10.

As shown in FIG. 11a, when the switch $S_1$ is turned on, the first connection control device $VD'_{01}$ and the third connection control device $VD'_{03}$ are turned on, the second connection control device $VD'_{02}$ is turned off, and the power supply voltage Ui charges the inductor elements and the capacitor elements in the two boosting units 1010 and 1020, in this case, the two boosting units 1010 and 1020 are connected in parallel in the circuit. Similar to FIG. 7a, in each of the boosting units 1010 and 1020, the first unidirectional conducting devices $VD_{11}$, $VD_{21}$, the second unidirectional conducting devices $VD_{12}$, $VD_{22}$ and the fourth unidirectional conducting devices $VD_{14}$, $VD_{24}$ are turned on, the third unidirectional conduction devices $VD_{13}$, $VD_{23}$ and the main diode $VD_5$ are turned off, and the DC input power supply Ui charges the inductors $L_{11}$, $L_{12}$, $L_{21}$, $L_{22}$ and the boosting capacitors $C_1$, $C_2$. In this case, in the boosting circuit 1010, the first inductor $L_{11}$, the second inductor $L_{12}$ and the boosting capacitor $C_1$ are connected in parallel in the circuit, and the voltage across the two terminals of the inductor $L_{11}$ and the voltage across the two terminals of the inductor $L_{12}$ are both Ui; and in the boosting circuit 1020, the first inductor $L_{21}$, the second inductor $L_{22}$ and the boosting capacitor $C_2$ are connected in parallel in the circuit, and the voltage across the two terminals of the inductor $L_{21}$ and the voltage across the two terminals of the inductor $L_{22}$ are both Ui.

As shown in FIG. 11b, when the switch $S_1$ is turned off, the first and third connection control devices $VD'_{01}$, $VD'_{03}$ are turned off and the second connection control device $VD'_{02}$ is turned on, thus the two boosting units 1010 and 1020 are connected in series in the circuit. Since the inductor current has the characteristic of incapability of instantaneously jumping, it needs to form a discharge freewheeling circuit loop together with the load, in conjunction with the ON/OFF principle of the diode element itself, in this case, similar to FIG. 7b, in each of the boosting units 1010 and 1020, the first unidirectional conducting devices $VD_{11}$, $VD_{21}$, the second unidirectional conducting devices $VD_{12}$, $VD_{22}$ and the fourth unidirectional conducting devices $VD_{14}$, $VD_{24}$ are turned off, the third unidirectional conducting devices $VD_{13}$, $VD_{23}$ and the main diode $VD_5$ are turned on and form a freewheeling circuit loop together with the first inductors $L_{11}$, $L_{21}$ and the second inductors $L_{12}$, $L_{22}$. In this case, in the boosting unit 1010, the first inductor $L_{11}$, the second inductor $L_{12}$ and the boosting capacitor $C_1$ are connected in series in the circuit and operate collectively; and in the boosting circuit 1020, the first inductor $L_{21}$, the second inductor $L_{22}$ and the boosting capacitor $C_2$ are connected in series in the circuit and operate collectively.

Further, according to the volt-second balance principle of the inductor, it can be derived that, voltage gain of the circuit is Uo/Ui=2(1+D)/(1−D). Thus, in comparison to the DC-DC converter 600 shown in FIG. 6, the DC-DC converter 1000 according to an embodiment of the present disclosure further increases the voltage gain.

FIGS. 12a to 12d are simulation schematic diagrams showing waveforms of the voltage across two terminals of the main diode $VD_5$, the current across two terminals of the first inductor $L_{11}$ or $L_{21}$, the voltage across two terminals of the boosting capacitor $C_1$ or $C_2$, and the output voltage Uo of the DC-DC converter shown in FIG. 10.

Figure 13:
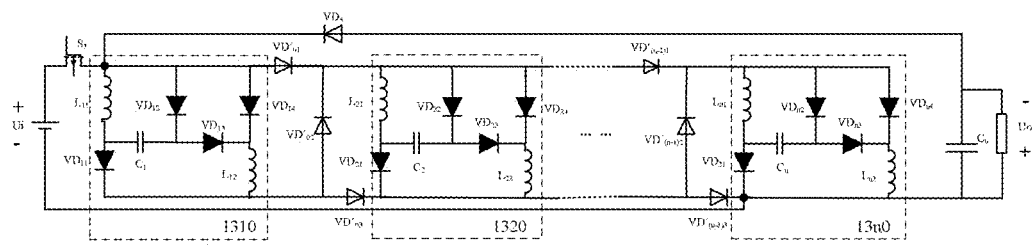
FIG. 13 is a schematic circuit diagram showing structure of a DC-DC converter according to yet another embodiment of the present disclosure.

FIG. 13 is a schematic circuit diagram showing structure of a DC-DC converter 1300 according to yet another embodiment of the present disclosure.

As shown in FIG. 13, the DC-DC converter 1300 comprises n boosting units 1310 to 13n0, n is a natural number greater than or equal to 2, and specific structure of each of the boosting units 1310 to 13n0 is the same as that of the boosting unit 610 shown in FIG. 6, details will not be described here.

In addition, as shown therein, similar to the DC-DC converter 1000 in FIG. 10, the boosting units 1310 to 13n0 are cascaded in stages, and the DC-DC converter 1300 further comprises a connection control unit connected between every two stages of boosting units and configured to connect the boosting unit in a present stage in parallel with the boosting unit in a previous stage during a charging period and to connect the boosting unit in a present stage in series with the boosting unit in a previous stage during a discharging period.

Structure of the connection control unit in FIG. 13 is the same as that of the connection control unit 1030 shown in FIG. 10, and details will not be described again. As shown in FIG. 13, the anode of the first connection control device $VD'_{(n-1)1}$ is connected to the input terminal of the boosting unit in a previous stage, the cathode of the first connection control device VD'$_{(n-1)1}$ is connected to the input terminal of the boosting unit in a next stage; the anode of the control device VD'$_{(n-1)2}$ is connected to the output terminal of the boosting unit in the previous stage, the cathode of the control device VD'$_{(n-1)2}$ is connected to the cathode of the first connection control device; and the anode of the third connection control device VD'$_{(n-1)3}$ is connected to the output terminal of the boosting unit in the previous stage, and the cathode of the third connection control device VD'$_{(n-1)3}$ is connected to the output terminal of the boosting unit in the next stage.

The boosting units 1310 to 13n0 are connected in parallel when the switch $S_1$ is turned on, and the boosting units 1310 to 13n0 are connected in series when the switch $S_1$ is turned off. In addition, when the switch $S_1$ is turned on, the inductors and the capacitors in each of the boosting units are connected in parallel in the circuit. When the switch $S_1$ is turned off, the inductors and the capacitors in each of the boosting units are connected in series in the circuit. According to the volt-second balance principle of the inductor in the circuit, it can be derived that, voltage gain of the circuit is Uo/Ui=n(1+D)/(1−D), where D is a duty cycle of the signal that controls the switch S.

By adopting the DC-DC converter 1300 according to an embodiment of the present disclosure, voltage gain can increase along with the increase in the number of boosting units without being strictly limited by the circuit topology structure. That is to say, voltage gain of the DC-DC converter according to an embodiment of the present disclosure is proportional to the number n of the boosting units.

Figure 14:
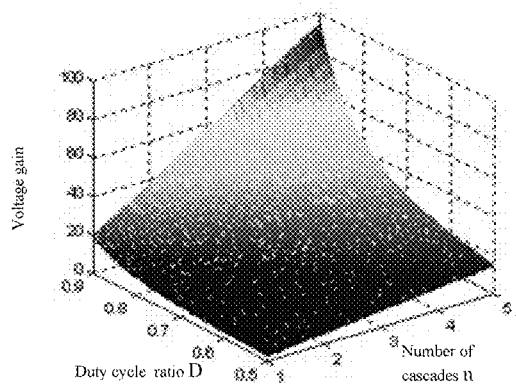
FIG. 14 is a curve showing change in the voltage gain along with the duty cycle D and the number n of the boosting units.

FIG. 14 is a curve showing change in the voltage gain along with the duty cycle D and the number n of the boosting units.

According to this embodiment, the number of boosting units comprised by the DC-DC converter is two or more, thereby voltage gain can be further increased. Thus, those skilled in the art can flexibly select the number n of the boosting units as needed to achieve a desired voltage gain, which increases the flexibility of circuit design.

Specific values of the elements included in the DC-DC converter according to an embodiment of the present disclosure may be, for example, as shown in Table 1.

TABLE 1

| Inductance L | 1 mH |
| --- | --- |
| Capacitance C1~Cn | 100 uF |
| Capacitance C0 | 4.47 uF |
| Diode withstanding voltage | Ui + Uo |

According to yet another embodiment of the present disclosure, there is provided a battery backup system comprising any of the DC-DC converters as described above.

According to still another embodiment of the present disclosure, there is provided an electric vehicle comprising any of the DC-DC converters as described above.

It should be noted that, for clarity and conciseness, only portions of the present disclosure are shown in the drawings, but it should be understood by those skilled in the art that the apparatus or device shown in the drawings may include other necessary units.

The above described merely are specific implementations of the present disclosure, but the protection scope of the present disclosure is not limited thereto, modification and replacements easily conceivable for those skilled in the art within the technical range revealed by the present disclosure all fall into the protection scope of the present disclosure. Therefore, the protection scope of the present disclosure is based on the protection scope of the claims.

The present application claims priority of the Chinese Patent Application No. 201610634582.8 filed on Aug. 4, 2016, the entire disclosure of which is hereby incorporated in full text by reference as part of the present application.

What is claimed is:

1. A boosting unit, comprising:
   a first inductor, a first terminal of the first inductor being connected to an input terminal of the boosting unit;
   a boosting capacitor, a first terminal of the boosting capacitor being connected to a second terminal of the first inductor;
   a first unidirectional conducting device, a first terminal of the first unidirectional conducting device being connected to the second terminal of the first inductor, and a second terminal of the first unidirectional conducting device being connected to an output terminal of the boosting unit;
   a second unidirectional conducting device, a first terminal of the second unidirectional conducting device being connected to the first terminal of the first inductor, and a second terminal of the second unidirectional conducting device being connected to a second terminal of the boosting capacitor;
   a third unidirectional conducting device, a first terminal of the third unidirectional conducting device being connected to the second terminal of the boosting capacitor;
   a fourth unidirectional conducting device, a first terminal of the fourth unidirectional conducting device being connected to the first terminal of the first inductor without a switching element intervened therebetween; and
   a second inductor, a first terminal of a second inductor being connected to a second terminal of the third unidirectional conducting device and a second terminal of the fourth unidirectional conducting device, and a second terminal of the second inductor being connected to a second terminal of the first unidirectional conducting device.

2. The boosting unit according to claim 1, wherein during a charging period, the first unidirectional conducting device, the second unidirectional conducting device and the fourth unidirectional conducting device are turned on, and the third unidirectional conducting device is turned off; and during a discharging period, the first unidirectional conducting device, the second unidirectional conducting device and the fourth unidirectional conducting device are turned off, and the third unidirectional conducting device is turned on.

3. The boosting unit according to claim 1, wherein each of the first unidirectional conducting device, the second unidirectional conducting device, the third unidirectional conducting device and the fourth unidirectional conducting device is a diode, and a first terminal of each of the unidirectional conducting devices is an anode of the corresponding diode and a second terminal of each of the unidirectional conducting devices is a cathode of the corresponding diode.

4. A DC-DC converter, comprising:
   a switch connected to an input voltage;
   a main diode connected to the switch;
   a regulating capacitor, a first terminal of the regulating capacitor being connected in series with the main diode, a second terminal of the regulating capacitor being connected to the input voltage, and the first terminal and the second terminal of the regulating capacitor serving as an output terminal of the DC-DC converter; and at least one boosting unit, the boosting unit comprising:
a first inductor, a first terminal of the first inductor being connected to an input terminal of the boosting unit;
a boosting capacitor, a first terminal of the boosting capacitor being connected to a second terminal of the first inductor;
a first unidirectional conducting device, a first terminal of the first unidirectional conducting device being connected to the second terminal of the first inductor, and a second terminal of the first unidirectional conducting device being connected to an output terminal of the boosting unit;
a second unidirectional conducting device, a first terminal of the second unidirectional conducting device being connected to the first terminal of the first inductor, and a second terminal of the second unidirectional conducting device being connected to a second terminal of the boosting capacitor;
a third unidirectional conducting device, a first terminal of the third unidirectional conducting device being connected to the second terminal of the boosting capacitor;
a fourth unidirectional conducting device, a first terminal of the fourth unidirectional conducting device being connected to the first terminal of the first inductor without a switching element intervened therebetween; and
a second inductor, a first terminal of a second inductor being connected to a second terminal of the third unidirectional conducting device and a second terminal of the fourth unidirectional conducting device, and a second terminal of the second inductor being connected to a second terminal of the first unidirectional conducting device.

5. The DC-DC converter according to claim 4, wherein the number of the boosting unit comprised by the DC-DC converter is one,
during a charging period, the first unidirectional conducting device, the second unidirectional conducting device and the fourth unidirectional conducting device are turned on, and the third unidirectional conducting device is turned off; and during a discharging period, the first unidirectional conducting device, the second unidirectional conducting device and the fourth unidirectional conducting device are turned off, and the third unidirectional conducting device is turned on.

6. The DC-DC converter according to claim 4, wherein the number of the boosting unit comprised by the DC-DC converter is two or more, the two or more boosting units are cascaded in stages, and the DC-DC converter further comprises:
a connection control unit connected between every two stages of boosting units and configured to connect the boosting unit in a present stage in parallel with the boosting unit in a previous stage during a charging period and to connect the boosting unit in a present stage in series with the boosting unit in a previous stage during a discharging period.

7. The DC-DC converter according to claim 6, wherein the connection control unit comprises:
a first connection control device, a first terminal of the first connection control device being connected to an input terminal of the boosting unit in a previous stage, and a second terminal of the first connection control device being connected to an input terminal of the boosting unit in a next stage;
a second connection control device, a first terminal of the second connection control device being connected to an output terminal of the boosting unit in the previous stage, and a second terminal of the second connection control device being connected to the second terminal of the first connection control device; and
a third connection control device, a first terminal of the third connection control device being connected to an output terminal of the boosting unit in the previous stage, and a second terminal of the third connection control device being connected to an output terminal of the boosting unit in the next stage.

8. The DC-DC converter according to claim 7, wherein during a charging period, the first connection control device and the third connection control device are turned on, and the second connection control device is turned off; during a discharging period, the first connection control device and the third connection control device are turned off, and the second connection control device is turned on.

9. The DC-DC converter according to claim 7, wherein each of the first connection control device, the second connection control device and the third connection control device is a diode, and a first terminal of each of the connection control devices is an anode of the corresponding diode and a second terminal of each of the connection control devices is a cathode of the corresponding diode.

10. The DC-DC converter according to claim 4, wherein during a charging period, the first unidirectional conducting device, the second unidirectional conducting device and the fourth unidirectional conducting device are turned on, and the third unidirectional conducting device is turned off; and during a discharging period, the first unidirectional conducting device, the second unidirectional conducting device and the fourth unidirectional conducting device are turned off, and the third unidirectional conducting device is turned on.

11. The DC-DC converter according to claim 4, wherein each of the first unidirectional conducting device, the second unidirectional conducting device, the third unidirectional conducting device and the fourth unidirectional conducting device is a diode, and a first terminal of each of the unidirectional conducting devices is an anode of the corresponding diode and a second terminal of each of the unidirectional conducting devices is a cathode of the corresponding diode.

12. A battery backup system comprising a DC-DC converter as claimed in claim 4.

13. The battery backup system according to claim 12, wherein the number of the boosting unit comprised by the DC-DC converter is one,
during a charging period, the first unidirectional conducting device, the second unidirectional conducting device and the fourth unidirectional conducting device are turned on, and the third unidirectional conducting device is turned off; and during a discharging period, the first unidirectional conducting device, the second unidirectional conducting device and the fourth unidirectional conducting device are turned off, and the third unidirectional conducting device is turned on.

14. The battery backup system according to claim 12, wherein the number of the boosting unit comprised by the DC-DC converter is two or more, the two or more boosting units are cascaded in stages, and the DC-DC converter further comprises:

a connection control unit connected between every two stages of boosting units and configured to connect the boosting unit in a present stage in parallel with the boosting unit in a previous stage during a charging period and to connect the boosting unit in a present stage in series with the boosting unit in a previous stage during a discharging period.

15. The battery backup system according to claim 14, wherein the connection control unit comprises:
   a first connection control device, a first terminal of the first connection control device being connected to an input terminal of the boosting unit in a previous stage, and a second terminal of the first connection control device being connected to an input terminal of the boosting unit in a next stage;
   a second connection control device, a first terminal of the second connection control device being connected to an output terminal of the boosting unit in the previous stage, and a second terminal of the second connection control device being connected to the second terminal of the first connection control device; and
   a third connection control device, a first terminal of the third connection control device being connected to an output terminal of the boosting unit in the previous stage, and a second terminal of the third connection control device being connected to an output terminal of the boosting unit in the next stage.

16. The battery backup system according to claim 15, wherein during a charging period, the first connection control device and the third connection control device are turned on, and the second connection control device is turned off; during a discharging period, the first connection control device and the third connection control device are turned off, and the second connection control device is turned on.

17. The battery backup system according to claim 15, wherein each of the first connection control device, the second connection control device and the third connection control device is a diode, and a first terminal of each of the connection control devices is an anode of the corresponding diode and a second terminal of each of the connection control devices is a cathode of the corresponding diode.

18. The battery backup system according to claim 12, wherein during a charging period, the first unidirectional conducting device, the second unidirectional conducting device and the fourth unidirectional conducting device are turned on, and the third unidirectional conducting device is turned off; and during a discharging period, the first unidirectional conducting device, the second unidirectional conducting device and the fourth unidirectional conducting device are turned off, and the third unidirectional conducting device is turned on.

19. The battery backup system according to claim 12, wherein each of the first unidirectional conducting device, the second unidirectional conducting device, the third unidirectional conducting device and the fourth unidirectional conducting device is a diode, and a first terminal of each of the unidirectional conducting devices is an anode of the corresponding diode and a second terminal of each of the unidirectional conducting devices is a cathode of the corresponding diode.

20. An electric vehicle comprising a DC-DC converter as claimed in claim 4.

* * * * *